United States Patent [19]
Sugiyama et al.

[11] Patent Number: 5,912,717
[45] Date of Patent: Jun. 15, 1999

[54] HOMEOTROPIC LIQUID CRYSTAL DISPLAY AND ITS MANUFACTURE

[75] Inventors: Takashi Sugiyama, Kawasaki; Yasuo Toko, Machida; Kiyoshi Ando, Tokyo, all of Japan

[73] Assignee: Stanley Electric Co., Ltd., Tokyo, Japan

[21] Appl. No.: 08/794,009

[22] Filed: Feb. 3, 1997

[30] Foreign Application Priority Data

Feb. 5, 1996 [JP] Japan .................................. 8-019025

[51] Int. Cl.$^6$ .................................................. G02F 1/1337
[52] U.S. Cl. ........................................... 349/124; 349/130
[58] Field of Search ..................................... 349/124, 130

[56] References Cited

U.S. PATENT DOCUMENTS

| | | | |
|---|---|---|---|
| 5,359,439 | 10/1994 | Miller et al. ............................ | 349/124 |
| 5,453,862 | 9/1995 | Toko et al. . | |
| 5,464,669 | 11/1995 | Kang et al. . | |
| 5,477,356 | 12/1995 | Kobayashi et al. . | |
| 5,538,823 | 7/1996 | Park et al. . | |
| 5,602,661 | 2/1997 | Schadt et al. . | |
| 5,604,615 | 2/1997 | Iwagoe et al. . | |
| 5,623,354 | 4/1997 | Lien et al. . | |
| 5,657,105 | 8/1997 | McCartney . | |

FOREIGN PATENT DOCUMENTS 0 525 478 A2  2/1993  European Pat. Off. .

OTHER PUBLICATIONS

H. Vithana et al: "A Well–Controlled tilted–Homeotropic Alignment Method and a Vertically Aligned Four–Domain LCD Fabricated by This Technique", 1995, SID International Symposium Digest of Technical Papers, Orlando, May 23–25, 1995, 1995 Society For Information Display, pp. 873–876.

Zili Li: "Photopolymerization induced orientation transition in a nematic liquid crystal cell", Liquid Crystals, Sep. 1995, UK, vol. 19, No. 3, ISSN 0267–8292, pp. 307–311.

T. Hashimoto et al: "TN–LCD with Quartered Subpixels Using Polarized UV–Light Irradiated Polymer Orientation Films", 1995 SID International Symposium Digest of Technical Papers, Orlando, USA, May 23–25, 1995, Society For Information Display, pp. 877–880.

Schadt et al, "Surface–Induced Parallel Alignment of Liquid Crystals by Linearly Polymerized Photopolymers", Japanese Journal of Applied Physics, vol. 31, No. 7, Part 1, Jul. 1, 1992, pp. 2155–2164.

Gibbons et al, "Optically Controlled Alignment of Liquid Crystals". Materials Research Society Symposium Proceedings, vol. 345, Apr. 5, 1994, pp. 211–216.

Patent Abstracts of Japan, vol. 012, No. 383 (P–770), Oct. 13, 1988 of JP 63 129323 A, (Asahi Glass Co., Ltd.) Jun. 1, 1988.

*Primary Examiner*—William L. Sikes
*Assistant Examiner*—James Dudek
*Attorney, Agent, or Firm*—Frishauf, Holtz, Goodman, Langer & Chick, P.C.

[57] ABSTRACT

A method of manufacturing a liquid crystal display device capable of easily giving a pre-tilt angle to a homeotropic orientation, the method having the steps of: forming a film of homeotropic orientation material on the surface of a substrate, the material being sensitive to ultraviolet ray and having a property of orientating liquid crystal molecules, on an average, vertically to the surface of the film; and applying ultraviolet rays to the film of homeotropic orientation material along a direction tilted from the normal to the surface of the film.

10 Claims, 3 Drawing Sheets

HOMEOTROPIC LIQUID CRYSTAL DISPLAY AND ITS MANUFACTURE

BACKGROUND OF THE INVENTION a) Field of the Invention

The present invention relates to a liquid crystal display device and its manufacture method, and more particularly to a liquid crystal display device having pre-tilt orientation slightly tilted in one direction from homeotropic orientation (configuration of liquid crystal molecules orientated vertical to the substrate surface) and its manufacture method.

b) Description of the Related Art

Homeotropic orientation is one of the operation modes of a liquid crystal display device. In this mode, liquid crystal molecules having negative dielectric anisotropy are orientated vertical to the substrate. As voltage is applied between the substrates, liquid crystal molecules tilt toward the substrate surface.

A radial direction about the substrate normal of liquid crystal molecules in homeotropic orientation is isotropic, and hence molecules tilt omnidirectionally about the substrate normal. To solve this, pre-tilt orientation has been proposed in which liquid crystal molecules are tilted slightly, in a state of no voltage application, in one radial direction about the substrate normal. Liquid crystal molecules with a pre-tilt angle in one radial direction about the substrate normal can be tilted in this one radial direction when voltage is applied.

The following methods are used for giving liquid crystal molecules a pre-tilt angle from the substrate normal toward the substrate surface.

(1) A homeotropic alignment film is formed on the surface of a substrate. The homeotropic alignment film is made of, for example, homeotropic orientation type polyimide (e.g., SE-1211 manufactured by Nissan Chemical Industries, Ltd., Japan) or silane coupling type homeotropic orientation material (e.g., DMOAP manufactured by Chisso Co., Japan). The surface of the homeotropic alignment film is thereafter rubbed with rayon cloth or the like.

As shown in FIG. 4A, CH chains designated by CH initially formed vertically on the surface S of a homeotropic alignment film P are slightly tilted by rubbing. The director d of each liquid crystal molecule ML tilts along the direction of the tilted CH chain. An angle between the substrate normal n and the director d of the liquid crystal molecule is called a pre-tilt angle $\theta_P$.

(2) As shown in FIG. 4B, an oblique vapor deposition film or the like made of SiO or other materials is formed on the surface of a substrate to form an underlying layer U having an oblique structure. A homeotropic alignment film P such as described above is formed on the underlying layer U. The surface of the homeotropic alignment film P has an oblique structure conformal to the oblique structure of the underlying layer U. Although each CH chain on the homeotropic alignment film P is vertical to the surface S of the homeotropic alignment film P, it is inclined relative to the substrate surface. In this case, rubbing is not necessary.

With the above method (1), different pre-tilt angles are likely to be formed if rubbing is nonuniform. Fine stripe disorders are also likely to be formed by rubbing. These different pre-tilt angles and fine stripe disorders are visually recognized as abnormal patterns on the liquid crystal display when it is turned on (in a voltage application state). This may considerably degrade the image quality of the liquid crystal display.

With the above method (2), relatively uniform pre-tilt orientation can be obtained. However, the manufacture processes are complicated. Oblique vapor deposition of SiO or the like requires a vacuum vapor deposition system so that cost is raised and throughput is lowered. If a large substrate is used and the relative positions of the substrate and the oblique vapor deposition source material change during the deposition process, many different pre-tilt angles are formed. In order to avoid this, a robust and complicated deposition system is required.

SUMMARY OF THE INVENTION

It is an object of the present invention to provide a manufacture method of a liquid crystal display device capable of easily adding a constant pre-tilt angle to liquid crystal molecules of homeotropic orientation.

According to one aspect of the present invention, there is provided a method of manufacturing a liquid crystal display device, comprising the steps of: forming a film of homeotropic orientation material on a surface of a substrate, the material being sensitive to ultraviolet ray and having a property of orientating liquid crystal molecules, on an average, vertically to a surface of the film; and applying ultraviolet rays to the film of homeotropic orientation material along a direction tilted from a normal to the surface of the film.

As ultraviolet rays are applied obliquely to a film of homeotropic orientation material sensitive to ultraviolet ray, a homeotropic alignment film can be obtained having a predetermined directivity in a direction tilted from the substrate normal.

A homeotropic alignment film has on its surface CH chains whose average direction is the substrate normal. It is presumed, however, that CH chains are omnidirectional in the plane parallel to the substrate surface. As ultraviolet rays are obliquely applied to the homeotropic alignment film, CH chains absorb ultraviolet rays and are decomposed or cut. Absorption of ultraviolet rays depends on the direction of CH chains of the homeotropic alignment film and on the illumination direction of ultraviolet rays. It is presumed that ultraviolet rays are absorbed at most when the direction of an electric vector of ultraviolet rays coincides with the direction of CH chains. Therefore, in the homeotropic alignment film after ultraviolet ray illumination, CH chains in one direction are decomposed or cut, and the mean direction of the remaining CH chains tilts from the substrate normal.

As above, uniform pre-tilt orientation can be formed easily by using a homeotropic alignment film.

DETAILED DESCRIPTION OF THE PREFERRED EMBODIMENTS

Embodiments of the invention will be described with reference to the accompanying drawings.

Figure 1A:
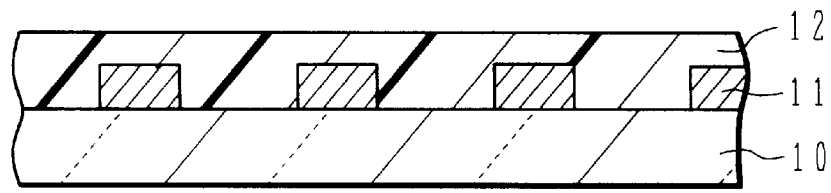
FIGS. 1A to 1D are schematic cross sectional views illustrating the manufacture processes of a liquid crystal display device according to an embodiment of the invention, and schematic cross sectional views explaining a pre-tilt angle.

As shown in FIG. 1A, on the surface of a transparent substrate 10 such as a glass substrate, a liquid crystal molecule drive structure such as parallel stripe electrodes 11 is formed and a homeotropic alignment film 12 is formed covering the stripe electrodes 11. For a simple matrix type liquid crystal display device, a substrate having parallel stripe common electrodes and a substrate having parallel stripe segment electrodes are used. For an active matrix type liquid crystal display device, a substrate having one common electrode and a substrate having an active matrix circuit are used (see, for example, U.S. Pat. No. 5,479,282 issued on Dec. 26, 1995 or U.S. Pat. No. 5,576,862 issued on Nov. 19, 1996, both assigned to the present assignee, which are herein incorporated by reference). The homeotropic alignment film 12 has an orientation structure of liquid crystal molecules orientated vertical to the surface of the alignment film 12.

Figure 1B:
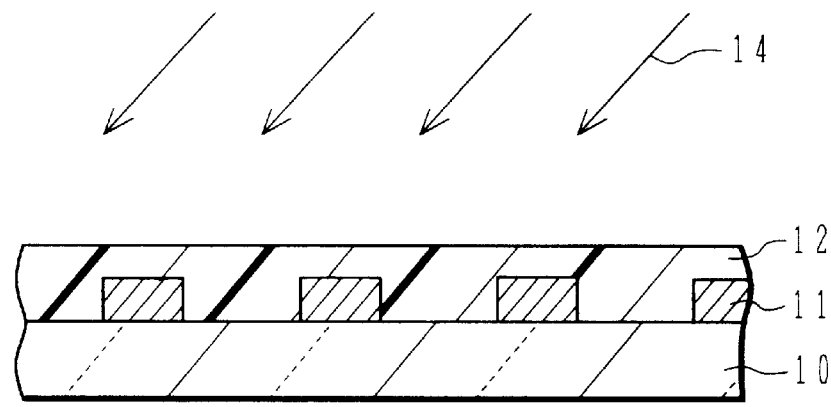

As shown in FIG. 1B, ultraviolet rays 14 are applied along a direction inclined relative to the direction normal to the homeotropic alignment film 12 (the direction normal to the substrate 10). Ultraviolet rays 14 may be natural light, or preferably linearly polarized light having an electric vector oscillating in the plane defined by the normal direction of the homeotropic alignment film 12 and the light incident direction, or elliptically polarized light having a longer axis direction in this plane.

The light incident direction of the ultraviolet rays 14 is a direction tilted from the substrate normal toward the substrate surface in a range from about 5 degrees to about 85 degrees, and more preferably in a range from about 30 degrees to about 70 degrees. A pre-tilt angle of each liquid crystal molecule has a tendency of becoming larger as the light incident angle is tilted larger.

An electric vector of ultraviolet rays incident along the oblique direction is in the plane perpendicular to the light incident direction, and no electric vector component exists along the direction (incident direction) perpendicular to this plane. It can therefore be presumed that oblique light, even perfectly unpolarized light (natural light), can provide a homeotropic alignment film with anisotropy and pre-tilt angle. It is preferable that electric vector components of polarized incident ultraviolet rays exist more in the plane defined by the substrate normal direction and the light incident direction. With such polarized light rays, the orientation of the underlying region including main-chains can also be controlled.

The homeotropic alignment film is sensitive to ultraviolet ray only in the inside of the film so that it is necessary to envisage ultraviolet rays after being entered in the homeotropic alignment film. In this context, even if unpolarized natural light is used, the obliquely incident natural light reflected at the surface of the homeotropic alignment film has a difference between P- and S-wave components. Therefore, anisotropy can be established in the alignment film.

It is necessary to make incident ultraviolet rays have such a wavelength as the homeotropic alignment film becomes sensitive to it. The wavelength is set generally to 400 nm or shorter, and preferably in a range from 180 nm to 360 nm.

It has been found that application of such ultraviolet rays provide the homeotropic alignment film with pre-tilt angle.

Figure 1C:
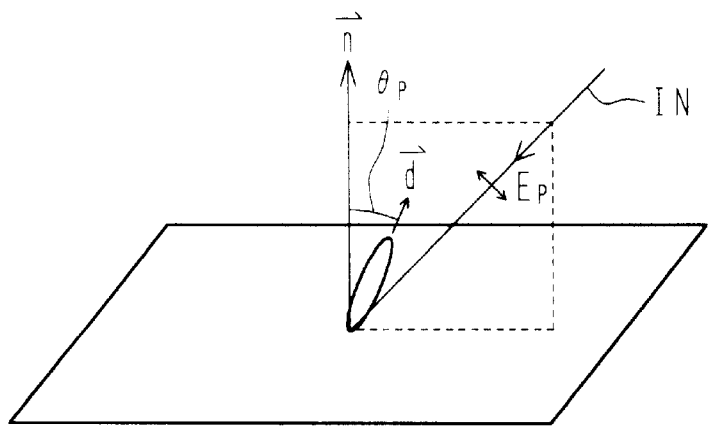
Figure 1D:
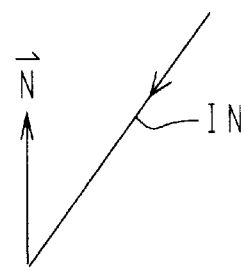

It has also been found that as shown in FIG. 1C, a radial direction of a pre-tilt angle $\theta_P$ about the substrate normal n is orientated in the plane defined by the substrate normal n and the light incident direction IN, and the pre-tilt angle is tilted from the normal direction n toward the light incident direction IN. The pre-tilt angle $\theta_P$ does not become coincident with an angle of the light incident direction IN.

As stated earlier, a pre-tilt angle can be more efficiently produced if the electric vector $E_P$ of incident ultraviolet rays is in the plane defined by the substrate normal n direction and the light incident direction IN. In the case of elliptic polarization, when the longer axis of elliptically polarized light is in this plane and the elliptically polarized light has a high ellipticity, the pre-tilt angle can be efficiently produced.

The principle of how a pre-tilt angle is produced by application of ultraviolet rays to a homeotropic alignment film, can be envisaged as in the following.

Figure 2A:
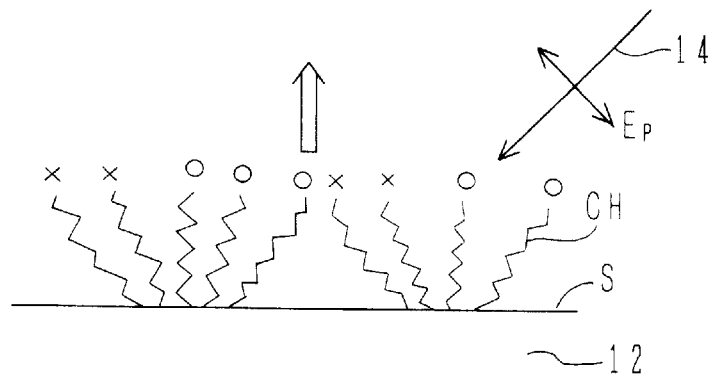
FIGS. 2A and 2B are schematic cross sectional views illustrating the principle of how the pre-tilt angle is formed in the liquid crystal display device of the embodiment shown in FIGS. 1A and 1B.

As shown in FIG. 2A, there are CH chains orientated in various directions on the surface S of a homeotropic alignment film 12. A mean direction of CH chains is coincident with the direction normal to the substrate surface S. In this state, liquid crystal molecules in contact with the homeotropic alignment film 12 are orientated in the directions of CH chains to establish homeotropic orientation. Although CH chains are orientated in various directions, a mean direction thereof is the substrate normal direction. Therefore, the liquid crystal molecules as a whole are orientated in the substrate normal direction.

Linearly polarized ultraviolet rays 14 incident upon the homeotropic alignment film 12 have their polarization direction in the plane defined by the substrate normal direction and the light incident direction. The intensity of each incident ultraviolet ray, to which respective CH chains in different directions become sensitive, corresponds to the component of the electric vector $E_P$ in the direction along each CH chain. Therefore, a CH chain parallel to the electric vector $E_P$ is influenced most, and a CH chain parallel to the light incident direction is hardly influenced.

Accordingly, a CH chain having the same or smaller angle relative to the electric vector of the incident ultraviolet rays absorbs the ultraviolet rays and is likely to be decomposed or cut. In FIG. 2A, a circle symbol is affixed to a CH chain not susceptible to ultraviolet rays, and a cross symbol is affixed to a CH chain susceptible to ultraviolet rays.

Figure 2B:
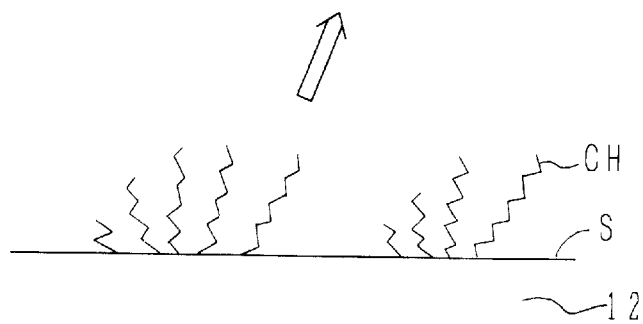

FIG. 2B shows the surface state of the homeotropic alignment film after ultraviolet rays are applied. Of the CH chains shown in FIG. 2A, those affixed with the cross symbol are decomposed or cut. The remaining CH chains are inclined on average from the substrate normal direction toward the ultraviolet ray incident direction. Therefore, liquid crystal molecules in contact with the homeotropic alignment film 12 are presumably orientated in the mean orientation direction of CH chains.

In the case of a homeotropic alignment film having its CH chain bonded to a main-chain as a side-chain, such as homeotropic orientation type polyimide, the side-chain is inclined according to the above-described principle. Here, there is a possibility of causing some anisotropy in the main-chain. In this case, it is preferable to generate anisotropy in the radial direction of pre-tilt angle, i.e., in the direction of intersection between the substrate surface and the plane defined by the substrate normal direction and the light incident direction. If there is no side-chain, it is preferable to orientate liquid crystal molecules in this direction. The molecular structure of the alignment film, light wavelength, and the like are desired to be selected to satisfy the above conditions.

Particular examples will be described below.

EXAMPLE 1

(1) Homeotropic orientation type polyimide (SE-1211 manufactured by Nissan Chemical Industries, Ltd., Japan) was coated on a glass substrate having a transparent electrode with a spinner and baked for one hour at 200° C. The film thickness after baking was 60 nm.

(2) Linearly polarized ultraviolet rays having a line spectrum near at a wavelength of 254 nm were applied to the substrate made at Step (1), for 15 seconds along a direction tilted by 45 degrees from the substrate normal. The illumination intensity measured with an ultraviolet illumination meter (manufactured by Orc Manufacturing Inc., Japan) mounted with a 254 nm detector was 2.3 mW/cm$^2$.

(3) The two substrates obtained at Step (2) were stacked via spherical spacers having a diameter of 5.5 μm, the two substrates being disposed with their illumination directions set in parallel in opposite directions.

(4) Negative dielectric anisotropy liquid crystal (EN-37 manufactured by Chisso Co., Japan) was injected into the empty cell between the two substrates by capillary phenomenon at a temperature of 110° C. at which the liquid crystal is isotropic.

Voltage was applied to the liquid crystal cell manufactured in the above manner. It was confirmed that liquid crystal molecules were uniformly tilted in the plane defined by the substrate normal and the ultraviolet ray illumination direction, away from the substrate normal. This means that uniform pre-tilt angles are formed in this radial direction about the substrate normal. The pre-tilt angle measured by a crystal rotation method was about 0.5 degrees.

Modification of Example 1

Ultraviolet ray illumination time was changed to 30 seconds, 60 seconds, 120 seconds, and 240 seconds. These liquid crystal cells with longer illumination times than Example 1 had uniform pre-tilt orientation similar to Example 1. The cells were inspected with a polarization microscope. It was found that the longer the illumination time, the presumably better the uniformity when liquid crystal molecules begin to tilt. This means an improvement on uniformity of pre-tilt angles.

Liquid crystal cells were formed also at an illumination angle of 60 degrees from the substrate normal at illumination times of 30 seconds and 60 seconds. Uniform pre-tilt angles of about 0.5 degrees were obtained.

EXAMPLE 2

(1) Homeotropic orientation type polyimide (SE-1211 manufactured by Nissan Chemical Industries, Ltd., Japan) was coated on a glass substrate having a transparent electrode with a spinner and baked for one hour at 200° C. The film thickness after baking was 60 nm.

(2) Linearly polarized ultraviolet rays having a line spectrum near at a wavelength of 313 nm were applied to the substrate made at Step (1), for 60 seconds along a direction tilted by 45 degrees from the substrate normal. The illumination intensity measured with an ultraviolet illumination meter (manufactured by Orc Manufacturing Inc., Japan) mounted with a 310 nm detector was 9.2 mW/cm$^2$.

(3) The two substrates obtained at Step (2) were stacked via spherical spacers having a diameter of 5.5 μm, the two substrates being disposed with their illumination directions set in parallel in opposite directions. Negative dielectric anisotropy liquid crystal (EN-37 manufactured by Chisso Co., Japan) was injected into the empty cell between the two substrates by capillary phenomenon at a temperature of 110° C. at which the liquid crystal is isotropic.

Voltage was applied to the liquid crystal cell manufactured in the above manner. It was confirmed that liquid crystal molecules were uniformly tilted in the plane defined by the substrate normal and the ultraviolet ray illumination direction, away from the substrate normal. This means that uniform pre-tilt angles are formed in this radial direction about the substrate normal. The pre-tilt angle measured by a crystal rotation method was about 0.4 degrees.

Modification of Example 2

Ultraviolet ray illumination time was changed to 120 seconds and 240 seconds. These liquid crystal cells had uniform pre-tilt orientation similar to Example 2. The cells were inspected with a polarization microscope. It was found that the longer the illumination time, the presumably better the uniformity (pre-tilt uniformity in radial direction and angle) when liquid crystal molecules begin to tilt, and that the uniformity was worse than Example 1 at a wavelength of 254 nm. The reason of the worse uniformity may be ascribed to a wavelength dependency of main-chains in the liquid crystal molecule orientation direction.

Liquid crystal cells were formed also at illumination times of 15 seconds and 30 seconds. Although some pre-tilt angles were presumably formed, uniformity was bad and not suitable for practical application.

EXAMPLE 3

(1) Silane coupling type homeotropic orientation material (DMOAP manufactured by Chisso Co., Japan) was coated on a glass substrate having a transparent electrode through dipping and baked for one hour at 100° C.

(2) Linearly polarized ultraviolet rays having a line spectrum near at a wavelength of 254 nm were applied to the substrate made at Step (1), for 15 seconds along a direction tilted by 45 degrees from the substrate normal. The illumination intensity measured with an ultraviolet illumination meter (manufactured by Orc Manufacturing Inc., Japan) mounted with a 254 nm detector was 2.3 mW/cm$^2$.

(3) The two substrates obtained at Step (2) were stacked via spherical spacers having a diameter of 5.5 μm, the two substrates being disposed with their illumination directions set in parallel in opposite directions.

Negative dielectric anisotropy liquid crystal (EN-37 manufactured by Chisso Co., Japan) was injected into the empty cell between the two substrates by capillary phenomenon at a temperature of 110° C. at which the liquid crystal is isotropic.

Voltage was applied to the liquid crystal cell manufactured in the above manner. It was confirmed that liquid crystal molecules were uniformly tilted in the plane defined by the substrate normal and the ultraviolet ray illumination direction, away from the substrate normal. This means that uniform pre-tilt angles are formed in this radial direction about the substrate normal. The pre-tilt angle measured by a crystal rotation method was about 0.5 degrees.

Modification of Example 3

Ultraviolet ray illumination time was changed to 30 seconds and 60 seconds. These liquid crystal cells had uniform pre-tilt orientation similar to Example 3. The cells were inspected with a polarization microscope. It was found that the longer the illumination time, the presumably better the uniformity (pre-tilt uniformity) when liquid crystal molecules begin to tilt. Liquid crystal cells were formed also at illumination times of 120 seconds and 240 seconds. Although some pre-tilt angles were formed, uniformity was worse than that at the illumination time of 60 seconds.

Even if natural light is used instead of polarized light, anisotropy can be given to the homeotropic alignment film because the electric vector components of incident light do not exist along the light incident direction but exists only in the plane perpendicular to the light incident direction.

EXAMPLE 4

(1) Homeotropic orientation type polyimide (SE-1211 manufactured by Nissan Chemical Industries, Ltd., Japan) was coated on a glass substrate having a transparent electrode with a spinner and baked for one hour at 200° C. The film thickness after baking was 60 nm.

(2) Natural light rays having a line spectrum near at a wavelength of 254 nm were applied to the substrate made at Step (1), for 15 seconds along a direction tilted by 45 degrees from the substrate normal. The illumination intensity measured with an ultraviolet illumination meter (manufactured by Orc Manufacturing Inc., Japan) mounted with a 254 nm detector was 7.8 mW/cm$^2$.

(3) The two substrates obtained at Step (2) were stacked via spherical spacers having a diameter of 5.5 μm, the two substrates being disposed with their illumination directions set in parallel in opposite directions.

(4) Negative dielectric anisotropy liquid crystal (EN-37 manufactured by Chisso Co., Japan) was injected into the empty cell between the two substrates by capillary phenomenon at a temperature of 110° C. at which the liquid crystal is isotropic.

Voltage was applied to the liquid crystal cell manufactured in the above manner. It was confirmed that liquid crystal molecules were uniformly tilted in the plane defined by the substrate normal and the natural light ray illumination direction, away from the substrate normal. This means that uniform pre-tilt angles are formed in this radial direction about the substrate normal. The pre-tilt angle measured by a crystal rotation method was 0.3 degrees.

As above, uniform pre-tilt angles can be obtained by applying ultraviolet rays to a homeotropic alignment film. Even if pre-tilt angles are small, liquid crystal molecules are tilted uniformly and liquid crystal display devices of good quality can be manufactured.

A predetermined pre-tilt angle can be formed in a desired region of a substrate by using a photomask and the above-described illumination of oblique ultraviolet rays. If a plurality of masks are used, regions subjected to different ultraviolet ray illumination directions can be formed on a single substrate. Therefore, a multi-domain type liquid crystal display device having a plurality of orientation directions can be manufactured.

Figure 3A:
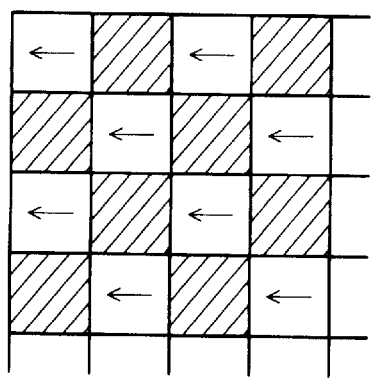
FIGS. 3A and 3B are schematic plan views illustrating the manufacture processes of a liquid crystal display device according to another embodiment of the invention.
Figure 3B:
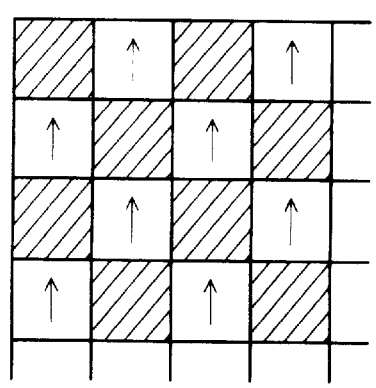
Figure 4A:
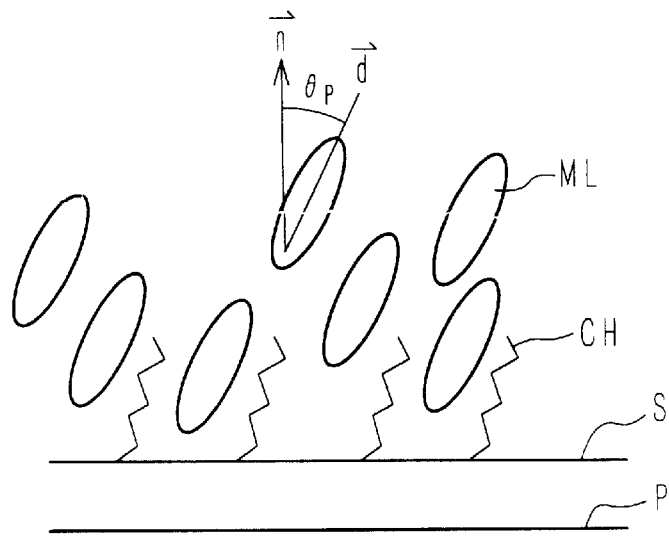
FIGS. 4A and 4B are schematic cross sectional views illustrating a conventional method of giving a pre-tilt angle to a homeotropic orientation film.
Figure 4B:
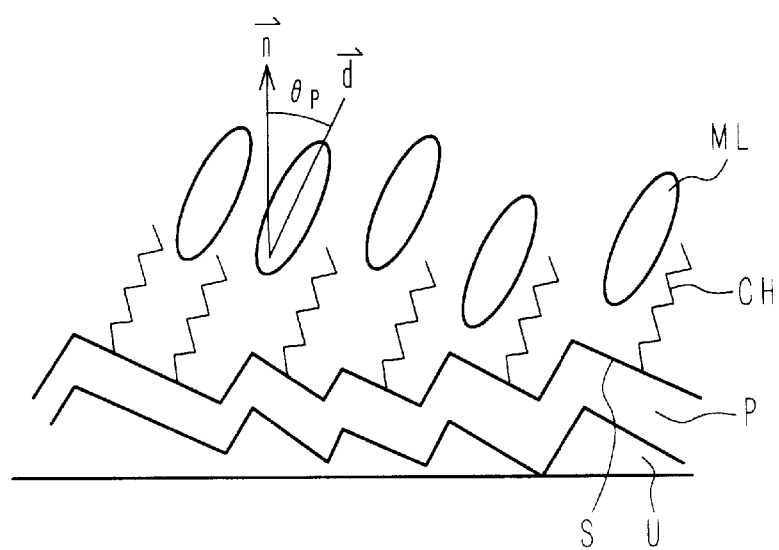

For example, by using two masks having complementary patterns such as shown in FIGS. 3A and 3B, ultraviolet rays can be applied in the two directions indicated by arrows rotated by 90 degrees in the substrate plane. Regions with hatched lines in FIGS. 3A and 3B are light shielded regions. By using the two masks, regions whose pre-tilt angles are different by 90 degrees in the substrate plane can be formed.

As shown in FIGS. 3A and 3B, regions having different orientation directions can be formed in a checkerboard pattern on a single substrate. If each orientation region is used as a micro domain and one pixel is constituted of two, four, or more micro domains, a liquid crystal display having a wide angle of view can be realized.

The present invention has been described in connection with the preferred embodiments. The invention is not limited only to the above embodiments. It is apparent that various modifications, improvements, combinations, and the like can be made by those skilled in the art.

We claim:

1. A method of manufacturing a liquid crystal display device comprising the steps of:

forming a film of homeotropic orientation material on a surface of a substrate, the material being sensitive to ultraviolet ray and having a property of orientating liquid crystal molecules, on an average, vertically to a surface of the film; and applying ultraviolet rays to the film of homeotropic orientation material along a direction tilted from a normal to the surface of the film.

2. A method according to claim 1, wherein said step of applying ultraviolet rays applies ultraviolet rays of natural light.

3. A method according to claim 1, wherein said step of applying ultraviolet rays applies linearly or elliptically polarized ultraviolet rays.

4. A method according to claim 3, wherein electric vector direction of the linearly polarized ultraviolet rays or longer axis direction of the electric vector of the elliptically polarized ultraviolet rays is in a plane defined by a normal direction to the substrate surface and ultraviolet ray application direction.

5. A method according to any one of claim 1, wherein the homeotropic orientation material is polyimide containing material.

6. A method according to any one of claim 1, wherein the homeotropic orientation material has silane coupling.

7. A method according to claim 5, wherein the polimide containing homeotropic orientation material has side-chains.

8. A method according to claim 1, wherein the direction tilted from a normal to the surface of the film is in a range from 5 degrees to 85 degrees from the normal to the film surface.

9. A method according to claim 8, wherein the direction tilted from the normal is in a range from 30 degrees to 70 degrees.

10. A method according to claim 1, wherein said step of applying ultraviolet rays comprises substeps of:

applying ultraviolet rays through a first mask along a first direction, and applying ultraviolet rays through a second mask different from the first mask along a second direction different from the first direction.

* * * * *